United States Patent
Shields

(12) 
(10) Patent No.: US 6,283,849 B1
(45) Date of Patent: Sep. 4, 2001

(54) VEHICLE FILTRATION CONTROL SYSTEM

(75) Inventor: Neal G. Shields, Ft Worth, TX (US)

(73) Assignee: Specific Cruise Systems, Inc., Fort Worth, TX (US)

( * ) Notice: Subject to any disclaimer, the term of this patent is extended or adjusted under 35 U.S.C. 154(b) by 0 days.

(21) Appl. No.: 09/679,908

(22) Filed: Oct. 5, 2000

(51) Int. Cl.[7] ................................................ B60H 3/06
(52) U.S. Cl. ........................ 454/75; 55/312; 454/158
(58) Field of Search ..................... 454/75, 158; 55/309, 55/309.1, 312, 467, 467.1, 473, 385.2, 484; 207/713

(56) References Cited

U.S. PATENT DOCUMENTS

| | | |
|---|---|---|
| 4,007,875 * | 2/1977 | Stolz et al. . |
| 4,365,541 | 12/1982 | Marques et al. . |
| 4,467,706 | 8/1984 | Batcheller et al. . |
| 5,009,683 | 4/1991 | Sun ........................................ 55/131 |
| 5,133,788 | 7/1992 | Backus .................................... 55/467 |
| 5,429,250 * | 7/1995 | Dobson et al. . |
| 5,562,286 | 10/1996 | Brinket ................. 273/309 |
| 5,601,636 | 2/1997 | Glucksman ............... 96/63 |
| 5,741,352 | 4/1998 | Ford et al. ................. 96/68 |
| 5,820,660 | 10/1998 | Ko ........................................ 96/30 |
| 5,860,856 | 1/1999 | Telch et al. ......................... 454/158 |

FOREIGN PATENT DOCUMENTS

| | | | |
|---|---|---|---|
| 43 29 330-A * | 3/1994 | (DE) | ................................... 454/158 |
| 6-278453-A * | 10/1994 | (JP) | ................................... 454/158 |

\* cited by examiner

*Primary Examiner*—Harold Joyce
(74) *Attorney, Agent, or Firm*—Bracewell & Patterson, L.L.P.

(57) ABSTRACT

A vehicle air filtration system having a fine and coarse filters. The system is responsive to temperature to maximize filter life and filtration efficiency. During normal operation, air from within the cab is recirculated through a fine filter as fresh air from outside the cab is drawn in through a coarse filter. If a vehicle door or window is opened, the system stops recirculating air through the fine filter, begins exhausting air, and only draws in air through the coarse filter. After a period of time, the system again begins recirculating air through the fine filter and ceases drawing in air through the coarse filter and exhausting air. After a second period of time it returns to normal operation. If the door or window is open only briefly, the system stops recirculating air though the fine filter and begins recirculating air through the coarse filter along with the fresh air (and begins exhausting air). After a period of time, the system again begins recirculating air through the fine filter and ceases drawing in air through the coarse filter and exhausting air. After a second period of time it returns to normal operation.

22 Claims, 1 Drawing Sheet

VEHICLE FILTRATION CONTROL SYSTEM

TECHNICAL FIELD

This invention relates in general to a environmental control system for filtering air in a vehicle cab. More specifically it relates to a control system which controls the flow of fresh and recycled air in a high particulate environment to minimize cab particulate levels and optimize filter life.

BACKGROUND OF THE INVENTION

In industries where workers must operate vehicles, including heavy machinery, in a high particulate environment, it is common for the vehicle to have an air filtration system either incorporated into the vehicle's heating and cooling system or free standing within the vehicle's cab. Filtration systems are essential, as extended exposure to air containing large amounts of particulate can be harmful to the worker. These filtration systems generally consist of a single filter placed to filter fresh and recirculated air within the vehicle's cab. In such systems, there is a trade off between the amount of filtering performed and the filter life. If a fine filter is used to clean the air thoroughly, it must be changed often because it fills with particulate quickly. If a coarse filter is used, it need not be changed as often, but allows a larger amount of particulate to remain in the air. This larger amount of particulate is less desirable because of the increased risk to the worker.

Some systems employ a two stage filter having a fine and a coarse filter to extend the life of the fine filter while still providing thorough filtration of the air. In a two stage filtration system, the air is routed first through a coarse filter, then through a fine filter. The fine filter is then subject to less particulate and lasts longer. This two stage filtration system is a marked improvement over the single filter systems, but both filters must still be changed often. Also, the filter life and efficiency is not maximized because the filter system utilizes both filters regardless of how much particulate is in the air being filtered.

A controlled filtration system that maximizes the life of the filters and thoroughness of the air filtration is needed. Such a system would respond to changing conditions in the cab and optimize the use of the fine and coarse filters to maximize their life and the filtration efficiency.

SUMMARY OF THE INVENTION

The present invention is drawn to a device for filtering particulate from air in a vehicle cab, the vehicle cab having a portal. It has a fine filter and a coarse filter. The fine filter is capable of filtering smaller particulate than the coarse filter. A recirculating air passageway has an inlet originating in the cab and an outlet changeable between a closed position, a fine filter position connecting the outlet to the fine filter, and a coarse filter position connecting the outlet to the coarse filter, for recirculating air within the cab through the filters. A fresh air passageway originates outside the cab and has an outlet changeable between a closed position and a coarse filter position connecting the outlet of the fresh air passageway to the coarse filter, for communicating air from outside the cab to the coarse filter. A sensor is included for sensing when the portal is open and outputting a signal. A controller receives the signal from the sensor and changes the positions of the recirculating and fresh air passageways for a selected period to reduce clogging of the filters.

When the controller senses that the portal is opened for less than a selected time, it changes the recirculating air passageway to the coarse filter position for a first time period. Then, the controller changes the fresh air passageway to the closed position and changes the recirculating air passageway to the fine filter position for a second time period. Then the controller reopens the fresh air passageway to the coarse filter position and continues to keep the recirculating air passageway in the fine filter position.

When the controller senses that the portal is opened for greater than a selected time, the controller changes the recirculating air passageway to the closed position and changes an exhaust air passageway to the open position for a first period of time. Then, the controller changes the fresh air passageway and the exhaust air passageway to the closed position and changes the recirculating air passageway to the coarse filter position for a second time period. Then, the controller reopens the fresh air passageway to the coarse filter position and changes the recirculating air passageway to the fine filter position.

A squirrel cage blower having an axis of rotation has a scroll-shaped housing surrounding the blower. The housing has a housing inlet for receiving air and a housing outlet for discharging air from the blower. The fresh air passageway has an inlet at an inner portion of the housing outlet and an air condition condenser is positioned to receive the discharge of air from an outer portion of the housing outlet. The outer portion of the housing outlet is farther from the axis of rotation than the inner portion.

BEST MODE FOR CARRYING OUT THE INVENTION

Figure 1:
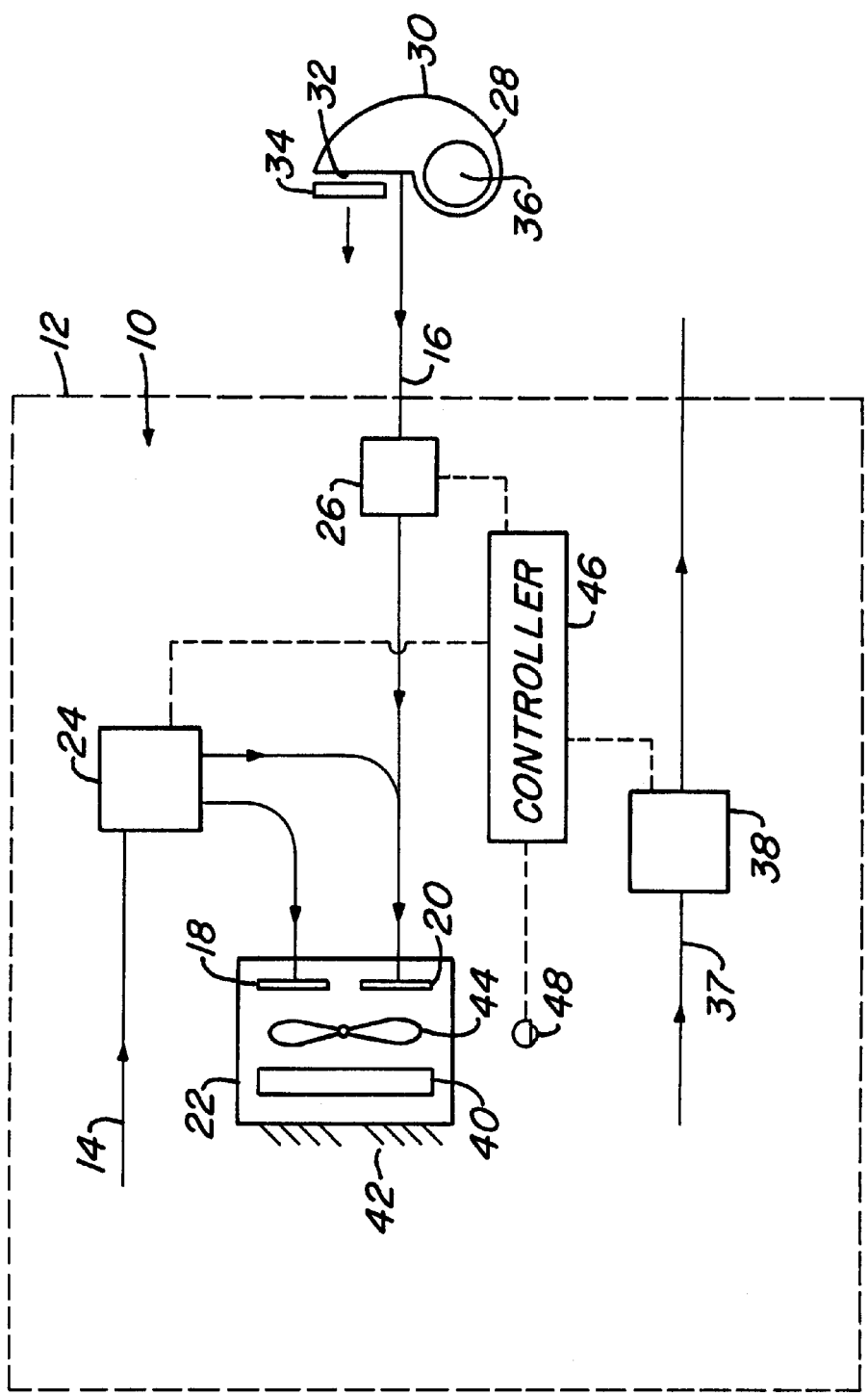
FIG. 1 is a schematic of a vehicle filtration control system constructed in accordance with this invention.

Referring to FIG. 1, an environmental control system 10 constructed in accordance with this invention is designed to be installed in the cab 12 of a vehicle. It can be incorporated integrally into cab 12 or configured as a stand alone unit. Generally system 10 has a recirculating duct 14 and a fresh air duct 16. Recirculating duct 14 draws air from within the cab 12 and routes that air through a fine filter 18 or a coarse filter 20 into a plenum 22. Fine filter 18 is preferably a submicron filter for filtering particulate much smaller than coarse filter 20. An electronically actuated door 24 can be set to route air from the recirculating duct 12 entirely through the fine filter 16, entirely through coarse filter 18, or stop airflow completely.

Fresh air duct 16 routes air from outside cab 12 through coarse filter 20 into plenum 22. A second electronically actuated door 26 meters the amount of outside air entering fresh air duct 16 and can completely shut duct 16 off.

Air is forced into fresh air duct 16 with a conventional squirrel cage blower 28 positioned outside vehicle cab 12. When viewed from the side, blower 28 is circular having a plurality of blades about its circumference, and rotates on an axis that is the center of the circle. Air is drawn in through the sides and ejected radially outward. A housing 30 surrounds the circumference of blower 28, starting close to the diameter of blower 28 at its top quadrant, maintaining this diameter until the third quadrant, and increasing in diameter as it curves around the remainder of the blower circumference. When housing 30 reaches the top quadrant of the circle again, it is at its greatest diameter and forms an outlet 32. Fresh air duct 16 is joined to a bottom portion of outlet 32 with the remainder ducted to blow through a different path, such as into a condenser 34. The remainder of housing 30 is enclosed with holes 36 at each end concentric with blower 28 and of a diameter less than the outer diameter of blower 28.

As blower 28 rotates, air is drawn in through holes 36 and ejected radially into housing 30. The air travels circumferentially around blower 28 through housing 30 and out outlet 32. Centripetal force causes particulate, such as dust, to migrate towards the outer curvature of housing 30. At outlet 32, the air exiting near the blower diameter contains less particulate while air exiting near the outer curvature of housing 30 contains a relatively higher level of particulate. Because fresh air duct 16 is positioned near the bottom of outlet 32, it receives cleaner air and housing 30 acts as a pre-filter. The air with relatively high amounts of particulate can be used to increase heat transfer in condenser 34.

An exhaust duct 37 is positioned below plenum 22 and exhausts air to the outside of cab 12. A third electronically actuated door 38 controls the flow through exhaust duct 37. Duct 37 may also have a fan or blower (not shown) to help draw air out of cab 12.

Plenum 22 contains fine filter 18 and coarse filter 20 positioned such that air exiting from these filters enters a heat exchanger 40, typically an air conditioner evaporator and/or a heater. Filters 18 and 20 are mounted to be easily removed and installed. Air from plenum 22 is heated or cooled by heat exchanger 40 and enters cab 12 through vents 42. Vents 42 are preferably adjustable to direct air to various portions of cab 12. A variable speed fan or blower 44, operable by a user, may be placed in plenum 22 to control air flow through vents 42.

Heat exchanger 40 is a conventional heat exchanger of a vehicle heating or cooling unit. Heat exchanger 40 may be an evaporator in an air cooling unit, wherein a refrigerant is compressed with a compressor (not shown), cooled by air flow over a condenser 34, and expanded before entering heat exchanger 40. The cooler expanded refrigerant then absorbs heat from air flow through heat exchanger 40, thus cooling the air flow. Heat exchanger 40 may also be a heating element that produces heat electrically or uses coolant from the vehicle's engine to heat air flowing through it. Heat exchanger 40 may also be an evaporator and a heating element coupled together, such that the evaporator can be used to cool the air flow or the heating element can be used to heat the air flow when desired.

A controller unit 46 is linked to doors 24, 26, 38 to control their opening and closing, and has a sensor 48 for determining the environmental conditions within cab 12. In the preferred embodiment, sensor 48 is a temperature sensor positioned in cab 12 to sense temperature changes, but sensor 48 could be a pressure sensor or a momentary switch linked to a cab door or window, each of which controller 46 can extrapolate environmental conditions within cab 12.

During normal operation, controller 46 positions recirculating door 24 to route all air in recirculating duct 14 through fine filter 18, thus fine filtering all air recirculated in the cab 12. Exhaust door 38 is closed. Controller 46 positions fresh air door 26 to allow approximately one fourth as much air into cab 12 as is recirculated by recirculating duct 14. Thus, 80% of the air flow exiting vents 42 is recirculated air cleaned by fine filter 18 and 20% is fresh air cleaned by coarse filter 20. As there is a constant flow of air into cab 12, cab 12 is pressurized at a greater pressure than the exterior pressure.

When controller 46 detects a temperature change at sensor 48, such as would result from opening a door or window to cab 12, controller 46 responds in one of two control loops.

If the temperature change is small, indicative of a door or window to cab 12 being briefly opened then closed, a first control loop is activated wherein recirculating door 24 is actuated to route all air in recirculating duct 14 through fine filter 18. This avoids sending air through fine filter 18 which may have been contaminated by the opening of the door of cab 12. Thus, all fresh air entering cab 12 through fresh air duct 16 and all recirculated air in cab 12 recirculated through recirculating duct 14 is filtered through coarse filter 20 at this time. The exhaust door 38 remains closed. The system operates in this configuration for a predetermined amount of time, then controller 46 actuates fresh air door 26 to shut off the flow of fresh air into cab 12 through fresh air duct 16 and actuates recirculating door 24 to route all air in recirculating duct 14 through fine filter 18. Thus, no fresh air is entering cab 12 and the air in cab 12 is being recirculated through fine filter 18. The system operates in this configuration for a predetermined time considered adequate to clean the interior air. Then the system returns to normal operation, wherein 80% of the air is recirculated through fine filter 18 and 20% of the air is fresh and filtered through coarse filter 20.

If the temperature change is large, indicative of a door being open for a longer period of time, a second control loop is actuated wherein controller 46 actuates recirculating door 24 to stop air flow through recirculating duct 14 and only allows air flow from fresh air duct 16. Thus, only fresh air filtered through coarse filter 20 is blown through vents 42. Exhaust door 38 is opened to discharge air out exhaust duct 37. No air is filtered through fine filter 18. The system operates in this configuration for a predetermined time, or until the temperature differential reduces—indicating the door or window to cab 12 is shut, then controller 46 actuates fresh air door 26 to shut off the flow of fresh air into cab 12 through fresh air duct 16 and actuates recirculating door 24 to route all air in recirculating duct 14 through fine filter 18. Thus, no fresh air is entering cab 12 and the air in cab 12 is being recirculated through fine filter 18. The system operates in this configuration for a predetermined time then returns to normal operation, wherein 20% of the air is recirculated through fine filter 18 and 80% of the air is fresh and filtered through coarse filter 20.

The present invention has several significant advantages over the prior art. Because the controller is responsive to changing cab conditions, it maximizes the filtration efficiency and filter life. It optimizes the use of a fine and coarse filter in combination with recirculating, fresh, and exhaust ducts to ensure the high particulate air is thoroughly filtered while still maximizing both the fine and coarse filter life.

While the invention has been shown or described in only some of its forms, it should be apparent to those skilled in the art that it is not so limited, but is susceptible to various changes without departing from the scope of the invention.

I claim:

1. A device for filtering particulate from air in a vehicle cab having at least one portal, comprising:

a first filter for filtering particulate from the air;

a first passageway for directing air through the first filter having an outlet changeable between a closed position ceasing air flow through the first filter and an open position allowing air flow through the first filter;

a sensor for sensing when the portal is open and outputting a signal; and a controller for receiving the signal from the sensor and changing the position of the first passageway for a selected period to reduce clogging of the first filter.

2. The device of claim 1 further comprising:

a second filter for filtering particulate from the air, the second filter being capable of filtering smaller particulate than the first filter;

a second passageway having an inlet originating in the cab and an outlet that is changeable between a closed position, a second filter position connecting the outlet to the second filter, and a first filter position connecting the outlet to the first filter, for recirculating air within the cab through the filters;

wherein the first passageway originates outside the cab and has an outlet for communicating air from outside the cab to the first filter; and wherein the controller can change the position of the first and second passageways for a selected period to reduce clogging of the filters.

3. The device of claim 2 wherein when the controller senses that the portal is opened for less than a selected time, it changes the recirculating air passageway to the first filter position for a first time period.

4. The device of claim 2 wherein when the controller senses that the portal is opened for less than a selected time, the controller changes the recirculating air passageway to the first filter position for a first time period, then the controller changes the fresh air passageway to the closed position and changes the recirculating air passageway to the second filter position for a second time period, then the controller reopens the fresh air passageway to the first filter position and continues to keep the recirculating air passageway in the second filter position.

5. The device of claim 2 wherein when the controller senses that the portal is opened for greater than a selected time, the controller changes the recirculating air passageway to the closed position for a first time period, then the controller changes the fresh air passageway to the closed position and changes the recirculating air passageway to the first filter position for a second time period, then the controller reopens the fresh air passageway to the first filter position and changes the recirculating air passageway to the second filter position.

6. The device of claim 2 wherein the sensor is a temperature sensor.

7. The device of claim 2 further comprising an exhaust air passageway originating in the cab and terminating outside the cab for discharging air from within the cab to outside the cab, said exhaust air passageway being changeable between open and closed positions to allow exhausting of air selectively.

8. The device of claim 2 further comprising an exhaust air passageway originating in the cab and terminating outside the cab for discharging air from within the cab to outside the cab, said exhaust air passageway being changeable between open and closed positions to allow exhausting of air selectively, wherein when the controller senses that the portal is opened for greater than a selected time, the controller changes the recirculating air passageway to the closed position and changes the exhaust air passageway to the open position for a first time period, then the controller changes the fresh air passageway to the closed position, changes the exhaust air passageway to the closed position, and changes the recirculating air passageway to the first filter position for a second time period, then the controller reopens the fresh air passageway to the first filter position and changes the recirculating air passageway to the second filter position.

9. The device of claim 2 further comprising a heat exchanger positioned to receive air flow from the filters for heating or cooling the air.

10. The device of claim 2 further comprising:

a squirrel cage blower having an axis of rotation;

a scroll-shaped housing surrounding the blower having a housing inlet for receiving air and a housing outlet for discharging air from the blower; and wherein the fresh air passageway has an inlet at an inner portion of the housing outlet;

an air conditioning condenser positioned to receive the discharge of air from an outer portion of the housing outlet, the outer portion being radially farther from the axis of rotation than the inner portion.

11. A device for filtering particulate from air in a vehicle cab having at least one portal, comprising:

a fine filter and a coarse filter for filtering particulate from the air, the fine filter being capable of filtering smaller particulate than the coarse filter;

a recirculating air passageway having an inlet originating in the cab and an outlet that is changeable between a fine filter position connecting the outlet to the fine filter and a coarse filter position connecting the outlet to the coarse filter, for recirculating air within the cab through the filters;

a sensor for sensing when the portal is open and outputting a signal; and a controller for receiving the signal from the sensor and changing the position of the recirculating passageway for a selected period to reduce clogging of the filters.

12. The device of claim 11 further comprising:

a fresh air passageway originating outside the cab and having an outlet changeable between a closed position and a coarse filter position connecting the outlet of the fresh air passageway to the coarse filter, for communicating air from outside the cab to the coarse filter; and wherein the controller also changes the position of the fresh air passageway for a selected period to reduce clogging of the filters.

13. The device of claim 11 wherein when the controller senses that the portal is opened for less than a selected time, the controller changes the recirculating air passageway to the coarse filter position for a first time period, then the controller changes the recirculating air passageway to the fine filter position.

14. The device of claim 11 wherein when the controller senses that the portal is opened for greater than a selected time, the controller changes the recirculating air passageway to the closed position for a first time period, then the controller changes the recirculating air passageway to the coarse filter position for a second time period, then the controller changes the recirculating air passageway to the fine filter position.

15. A device for filtering particulate from air in a vehicle cab having at least one portal, comprising:

a filter for filtering particulate from the air;

a fresh air passageway originating outside the cab and having an outlet connected to the filter, for communicating air from outside the cab to the filter;

a squirrel cage blower having an axis of rotation;

a scroll-shaped housing surrounding the blower having a housing inlet for receiving air and a housing outlet for discharging air from the blower; and wherein the fresh air passageway has an inlet at an inner portion of the housing outlet;

an air conditioning condenser positioned to receive the discharge of air from an outer portion of the outlet, the outer portion being radially farther from the axis of rotation than the inner portion.

16. A method of filtering particulate from air in a vehicle cab having at least one portal, comprising the steps of:
(a) recirculating air from within the cab through a fine filter;
(b) sensing an opening of the portal; then
(c) ceasing to recirculate air through the fine filter for a selected time interval; then
(d) again recirculating air through the fine filter.

17. The method of claim 16 wherein step (a) further comprises drawing air from outside the cab through a coarse filter and step (c) further comprises continuing to draw air through the coarse filter.

18. The method of claim 16 wherein step (a) further comprises drawing air from outside the cab through a coarse filter and step (c) further comprises recirculating air through the coarse filter for the selected time interval.

19. The method of claim 16 wherein step (a) further comprises drawing air from outside the cab through a coarse filter and step (c) further comprises ceasing to draw air into the cab for the selected time interval while recirculating air through the fine filter, then continuing to draw air in through the coarse filter.

20. The method of claim 16 wherein step (a) further comprises drawing air from outside the cab through a coarse filter and step (c) further comprises ceasing to draw air through the coarse filter, recirculating air through the fine filter, and then again drawing air through the coarse filter.

21. The method of claim 20 wherein step (c) further comprises opening an exhaust port while drawing fresh air thorough the coarse filter.

22. The method of claim 16 wherein step (a) further comprises the step of heating or cooling air from the fine and coarse filters.

* * * * *